C. BROWN.
MONUMENT.
APPLICATION FILED JULY 11, 1912.

1,060,970.

Patented May 6, 1913.

Charles Brown, INVENTOR

WITNESSES

BY

ATTORNEY

UNITED STATES PATENT OFFICE.

CHARLES BROWN, OF ALBERT LEA, MINNESOTA, ASSIGNOR OF ONE-HALF TO ALFEN P. SAWYER, OF GLENVILLE, MINNESOTA.

MONUMENT.

1,060,970.　　　　Specification of Letters Patent.　　　Patented May 6, 1913.

Application filed July 11, 1912. Serial No. 708,898.

*To all whom it may concern:*

Be it known that I, CHARLES BROWN, a citizen of the United States, residing at Albert Lea, in the county of Freeborn and State of Minnesota, have invented a new and useful Monument, of which the following is a specification.

The invention relates to improvements in monuments.

The object of the present invention is to improve the construction of monuments, and to provide a simple, practical and durable monument of inexpensive construction, equipped at the top with means for holding growing plants and having an interiorly arranged tank adapted to contain a relatively large amount of water located below the plants, so that the evaporation of the water will maintain the soil around the plants in a moist condition, thereby obviating the necessity of watering the plants at frequent intervals.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 1:
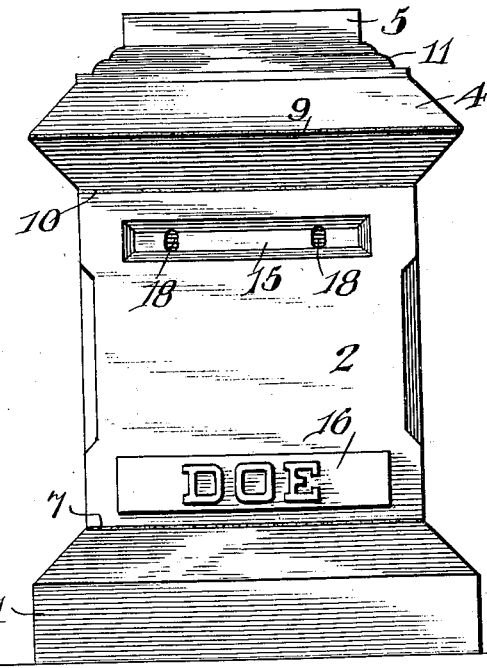
Figure 2:
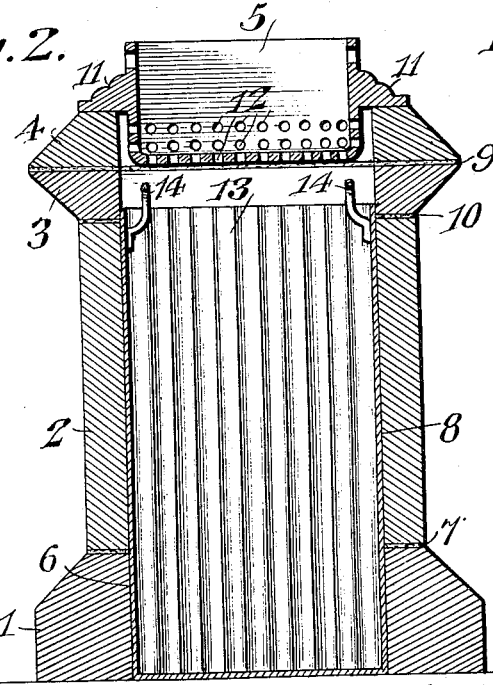
Figure 3:
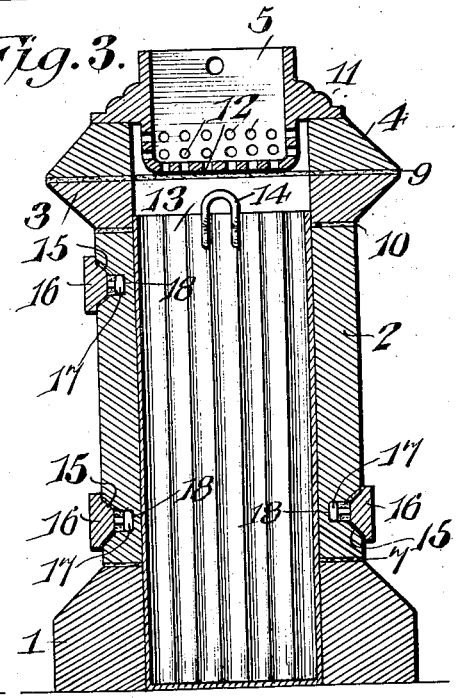

In the drawing:—Figure 1 is a front elevation of a monument, constructed in accordance with this invention. Fig. 2 is a central vertical sectional view. Fig. 3 is a similar view, taken at right angles to Fig. 2.

Like numerals of reference designate corresponding parts in all the figures of the drawing.

In the accompanying drawing in which is illustrated the preferred embodiment of the invention, the monument comprises in its construction a base 1, an upright body portion 2, upper sections 3 and 4 and a plant receptacle 5, which constitutes the top of the monument. The base 1, which is oblong and hollow, is constructed of concrete or other plastic material and is provided with a central longitudinal opening 6, preferably extending entirely through the base. The base, which may be exteriorly ornamented in any suitable manner, has its upper half exteriorly beveled while the lower half has vertical faces. The openings in the sections of the monument register and form a vertical chamber, which extends from the bottom to the top of the monument.

The upright body portion, which is also hollow, is of smaller cross sectional area than the base and is supported upon the base and secured to the same by cement 7, or other suitable means. The opening 8 of the upright body is of the same size and shape in horizontal section as the opening 6 of the base, and it registers with and forms a continuation of the same. The upper sections 3 and 4, which are oblong or hollow, are oppositely beveled to provide a projecting upper portion, and they are constructed of plastic material similar to the base and the upright body, but they may be formed integral with each other, or integral with the upright body portion. They are preferably constructed in two sections for convenience in molding and handling the parts, and they are secured together at 9 and upon the upper edges of the body portion at 10 by cement or other suitable means. The openings of the upper sections 3 and 4 coincide with and form extensions or continuations of the opening of the upright body.

The plant receptacle 5, which may be constructed of plastic or other suitable material, is provided at an intermediate point between its bottom and upper edges with a supporting flange 11, having a horizontal lower face to rest upon the upper edge of the section 4 and provided with an ornamental upper face. The supporting flange 11 may be of any form in cross section, and the upper portion of the plant receptacle constitutes the top of the monument. The lower portion below the flange and the bottom of the receptacle are provided at intervals with perforations 12 to permit moisture from a lower tank 13 to saturate the earth around the plants and maintain such soil in a moist condition.
The tank 13, which is removably arranged within the vertical chamber of the monument, is adapted to rest upon the ground and extends from the bottom thereof to a point above the body portion, and it assists in maintaining the monument in a stable condition and will prevent any separation of the parts, should the cement at the upper and lower edges of the body portion become loose. The tank, which may be constructed of galvanized corrugated sheet metal, or other suitable material, is equipped at the top with handles 14, and it is adapted to contain a large quantity of water, and it will obviate the necessity of frequently watering the plants contained within the top receptacle. By providing a tank or reservoir of this character, the top of the monument may be ornamented with either delicate or hardy plants, and they will be maintained through the evaporation of the water in fine condition during plant season.

The front of the upright body 2 is provided with a plurality of horizontal recesses 15, adapted to receive panels or tablets 16 of any suitable material for bearing the desired inscription. The panels may be secured in the recesses by cementing headed fastening devices 17 in sockets 18 in the rear walls of the recesses 15.

What is claimed is:—

1. A hollow monument comprising a plurality of separate hollow sections supported upon one another and having registering openings forming a vertical chamber, a tank or reservoir arranged within the chamber of the hollow monument and fitting the interior thereof and overlapping the joints of the sections, and a plant receptacle constituting the top of the monument and having an intermediate exterior flange resting upon the top section, said plant receptacle having its lower portion extending into the said vertical chamber and provided with openings.

2. A hollow monument comprising a plurality of separate hollow sections supported upon one another and having registering openings forming a vertical chamber extending entirely through the monument and open at the top, a tank or reservoir arranged snugly within the hollow chamber of the monument and fitting the interior thereof and overlapping the joints of the sections and extending from the upper portion of the monument to the bottom thereof and adapted to rest upon the ground, said tank being removable through the open upper end of the vertical chamber, and a plant receptacle constituting the top of the monument and closing the chamber above the tank, said receptacle being supported by the top section and having its lower portion extended within the vertical chamber and provided with openings.

In testimony, that I claim the foregoing as my own, I have hereto affixed my signature in the presence of two witnesses.

CHARLES BROWN.

Witnesses:
J. A. BLY,
H. G. SAWYER.